(12) United States Patent
Park et al.

(10) Patent No.: US 9,505,947 B2
(45) Date of Patent: Nov. 29, 2016

(54) PAINT COMPOSITION FOR PRE-COATED METAL AND METHOD OF CURING TREATMENT OF PRE-COATED METAL BY USING THE COMPOSITION

(75) Inventors: Jong Myung Park, Pohang-si (KR); Jung Teag Kim, Pohang-si (KR); Ho Su Jung, Busan (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 621 days.

(21) Appl. No.: 13/883,992

(22) PCT Filed: Feb. 16, 2012

(86) PCT No.: PCT/KR2012/001163
§ 371 (c)(1),
(2), (4) Date: May 8, 2013

(87) PCT Pub. No.: WO2012/111986
PCT Pub. Date: Aug. 23, 2012

(65) Prior Publication Data
US 2013/0230732 A1 Sep. 5, 2013

(30) Foreign Application Priority Data
Feb. 18, 2011 (KR) .................. 10-2011-0014768

(51) Int. Cl.
| | |
|---|---|
| C09D 167/00 | (2006.01) |
| C23C 26/00 | (2006.01) |
| C09D 175/04 | (2006.01) |
| C08J 3/24 | (2006.01) |
| B05D 3/02 | (2006.01) |
| C08G 18/80 | (2006.01) |
| C08G 18/42 | (2006.01) |
| C08L 61/28 | (2006.01) |

(52) U.S. Cl.
CPC ........... *C09D 167/00* (2013.01); *B05D 3/0209* (2013.01); *C08G 18/42* (2013.01); *C08G 18/8077* (2013.01); *C08J 3/244* (2013.01);
(Continued)

(58) Field of Classification Search
CPC .................................................. B05D 2701/30
See application file for complete search history.

(56) References Cited

U.S. PATENT DOCUMENTS

| | | | |
|---|---|---|---|
| 6,617,048 B1 | 9/2003 | Yoshida et al. | |
| 2002/0162627 A1* | 11/2002 | Dunlap | .................... C08J 3/244 156/307.1 |
| 2003/0059617 A1 | 3/2003 | Kojima et al. | |

(Continued)

FOREIGN PATENT DOCUMENTS

| | | |
|---|---|---|
| CN | 101379152 A | 3/2009 |
| CN | 101952343 A | 1/2011 |

(Continued)

OTHER PUBLICATIONS

European Search Report for EP Application No. 12 746 519.3 mailed May 9, 2014 from European Patent Office.

*Primary Examiner* — Erma Cameron
(74) *Attorney, Agent, or Firm* — Revolution IP, PLLC

(57) ABSTRACT

Provided is a paint composition for a two-step curing process including a binder resin containing a hydroxyl group and a hardener having a functional group reactable with the hydroxyl group. The paint composition includes: one or more binder resins selected from the group consisting of a polyester resin, an alkyd resin, an acryl resin, and a modified resin thereof; and a hardener including one or more selected from an isocyanate group and one or more selected from a melamine group, wherein mechanical processing is performed on a steel sheet coated with the composition and primarily cured, and then mechanical and chemical properties of a coating layer damaged during the mechanical processing are recovered through secondary curing.

7 Claims, 1 Drawing Sheet

(52) U.S. Cl.
CPC ............. *C09D175/04* (2013.01); *C23C 26/00* (2013.01); *B05D 3/0254* (2013.01); *B05D 2202/10* (2013.01); *B05D 2701/00* (2013.01); *B05D 2701/10* (2013.01); *B05D 2701/20* (2013.01); *B05D 2701/30* (2013.01); *B05D 2701/40* (2013.01); *C08L 61/28* (2013.01); *Y10T 428/31681* (2015.04)

(56) References Cited

U.S. PATENT DOCUMENTS

| | | | |
|---|---|---|---|
| 2004/0132854 A1* | 7/2004 | Du Plessis | C08J 3/244 522/114 |
| 2007/0209317 A1* | 9/2007 | Jensen | B05D 7/14 52/834 |
| 2009/0182084 A1 | 7/2009 | Ding et al. | |
| 2010/0136333 A1* | 6/2010 | Hayes | B05D 7/14 428/371 |
| 2010/0222505 A1 | 9/2010 | Moravek et al. | |
| 2011/0111130 A1* | 5/2011 | Hickl | B05D 7/544 427/388.2 |

FOREIGN PATENT DOCUMENTS

| | | |
|---|---|---|
| JP | 2002-285393 A | 10/2002 |
| KR | 10-2000-0046452 A | 7/2000 |
| KR | 10-2001-0057546 A | 7/2001 |
| KR | 10-2008-0083694 A | 9/2008 |
| KR | 10-0965736 B1 | 6/2010 |
| WO | 03/070844 A1 | 8/2003 |

* cited by examiner

PAINT COMPOSITION FOR PRE-COATED METAL AND METHOD OF CURING TREATMENT OF PRE-COATED METAL BY USING THE COMPOSITION

CROSS REFERENCE TO PRIOR APPLICATIONS

This application is a National Stage Application of PCT International Patent Application No. PCT/KR2012/001163 filed on Feb. 16, 2012, under 35 U.S.C. §371, which claims priority to Korean Patent Application No. 10-2011-0014768 filed on Feb. 18, 2011, which are all hereby incorporated by reference in their entirety.

TECHNICAL FIELD

The present invention relates to a paint composition for pre-coated metal and a method of a curing treatment of pre-coated metal by using the composition.

BACKGROUND ART

Paint for pre-coated metal (PCM) requires excellent weather resistance, corrosion resistance, scratch resistance, gloss, hardness, and flexibility, and has been variously used in exterior decoration materials for construction and household appliances. However, pre-coated metal must have specifications that may satisfy both high strength and excellent flexibility. With respect to a paint composition, strength and flexibility are properties contradictory to each other. A coating layer having high strength has excellent scratch resistance, but has low chipping resistance due to high brittleness and is very sensitive to heat. In contrast, a coating layer having high flexibility has excellent chipping resistance and is less sensitive to heat, but has low scratch resistance. Also, a coating layer of pre-coated metal may be greatly damaged by a welding process.

Recently, development of a technique for manufacturing a highly formable color steel sheet for an automobile has been required for automobile manufacturers for the purposes of manufacturing cost reduction, development of an environmental-friendly process, and simplification of processing. A method of assembling a full vehicle by using pre-coated metal is an innovative technique in terms of environmental friendliness and productivity, because all wet painting processes, such as pretreatment, electrodeposition, intercoating, and top coating processes, which are indispensible in a typical automotive coating process, may be omitted.

However, cracks in a coating layer may occur during curved surface forming due to differences in physical properties of a steel sheet and a molding material of the coating layer and appearance characteristics may be deteriorated. As a result, the method of assembling a full vehicle by using pre-coated metal has not been used so far in an automotive industry requiring attractive appearance and high gloss.

DISCLOSURE

Technical Problem

The present invention provides a paint composition for pre-coated metal able to improve deterioration of appearance characteristics generated in a molding process of the pre-coated metal.

The present invention also provides a method of a curing treatment of pre-coated metal including coating layer formation, mechanical molding, and heat treatment after molding, which is able to improve deterioration of appearance characteristics generated in a molding process of the pre-coated metal.

Technical Solution

According to an embodiment of the present invention, there is provided a paint composition for pre-coated metal including: one or more binder resins selected from the group consisting of a polyester resin, an alkyd resin, an acrylic resin, and a modified resin thereof; and a hardener including one or more selected from an isocyanate group and one or more selected from a melamine group, wherein mechanical processing is performed on a steel sheet coated with the composition and primarily cured, and then mechanical and chemical properties of a coating layer damaged during the mechanical processing are recovered through secondary curing.

According to another embodiment of the present invention, there is provided a method of a curing treatment of pre-coated metal including the steps of: (a) forming a coating layer by coating a surface of a steel sheet with a paint composition; (b) performing primary curing on the coating layer by heating within a temperature range of 180° C. to 300° C.; (c) molding the steel sheet having the primarily cured coating layer formed thereon by mechanical processing; and (d) performing secondary curing on the molded steel sheet by heating within a temperature range of 140° C. to 200° C. to recover physical properties of the coating layer damaged in the molding.

Also, the present invention provides a pre-coated steel sheet having a coating layer of the paint composition formed thereon.

Advantageous Effects

A steel sheet surface treated by using a paint composition according to an embodiment of the present invention has excellent flexibility, scratch resistance, color generation capacity, and glossiness, and may be variously used in an exterior panel for construction or an automobile.

BEST MODE

Figure 1:
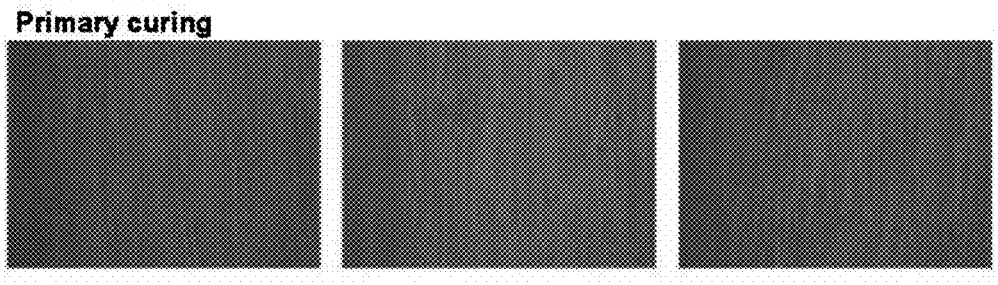
FIG. 1 is photographs showing appearances after primary curing, T-bending (1T), and secondary curing when paint compositions according to Example 2 are used.
Figure 1:

As a result of research and development for addressing decreases in physical properties of a coating layer generated during a molding operation of pre-coated metal, in particular, deterioration in appearance characteristics such as crack generation and discoloration, the present inventors found that the decreases in physical properties of a coating layer generated during a molding operation may be at least partially recovered, when the coating layer of pre-coated metal is not fully cured before molding, but primary curing providing physical properties of the coating layer required for mechanical processing and secondary curing through a heat treatment after the mechanical processing are performed, thereby leading to completion of the present invention.

A paint composition for pre-coated metal according to the present invention includes one of more binder resins selected from the group consisting of a polyester resin, an alkyd resin, an acrylic resin, and a modified resin thereof, and a hardener including one or more selected from an isocyanate group and one or more selected from a melamine group, wherein mechanical processing is performed on a steel sheet coated with the composition and primarily cured, and then mechanical and chemical properties of a coating layer damaged during the mechanical processing may be recovered through secondary curing.

The paint composition for pre-coated metal according to the present invention is characterized in that a mixing ratio between the binder resin and the hardener is controlled and thus, crosslink density may be controlled according to the processing of the pre-coated metal according to the present invention when the paint composition is used in the pre-coated metal. In general, strength and flexibility of a coating layer are properties contradictory to each other. A coating layer having high strength has excellent scratch resistance, but has low chipping resistance due to high brittleness and is very sensitive to heat. In contrast, a coating layer having high flexibility has excellent chipping resistance and is less sensitive to heat, but has low scratch resistance. The strength and flexibility greatly depend on the crosslink density of the binder resin and the hardener constituting the coating layer and with respect to a thermosetting polymer, the higher the crosslink density is, the lower the difference between glass transition temperature ($T_g$) and brittle-ductile transition temperature ($T_b$) is.

In consideration of correlation between the crosslink density and coating layer characteristics, the present inventors first provided predetermined physical properties required in the processing of the coating layer by using a short bake hardening process and then allowed appearance characteristics deteriorated by the processing to be recovered as well as strength and scratch resistance to be improved through an additional heat treatment after the processing is terminated.

The binder resin includes a hydroxyl group and a hydroxyl group value may be in a range of 5 mgKOH/g to 100 mgKOH/g. When the hydroxyl value is less than 5 mgKOH/g, hardening properties of the coating layer may be insufficient and chemical resistance and solvent resistance may decrease. In contrast, when the hydroxyl group value is greater than 100 mgKOH/g, a recovery rate of appearance by the secondary curing may be low. For example, the hydroxyl group value for the secondary curing may be in a range of 5 mgKOH/g to 50 mgKOH/g.

The binder resin is not particularly limited to the type thereof when the hydroxyl group value is within the foregoing range. For example, the binder resin may be a polyester resin, an alkyd resin, or an acrylic resin, and may be a modified resin thereof. The foregoing resins may be used alone or in combination thereof.

A number-average molecular weight of the binder resin may be in a range of 1,000 to 25,000. The reason for this is that when the number-average molecular weight is less than 1,000, processability may decrease, and when the number-average molecular weight is greater than 25,000, a solid content may decrease due to high viscosity.

As the hardener, an isocyanate compound may be used alone or in combination of other compounds. Melamine or a melamine resin may be used as another hardener and for example, the isocyanate compound and melamine compound may be used in combination.

Also, the isocyanate compound may be one or more selected from the group consisting of hexamethylene diisocyanate, isophorone diisocyanate, diphenylmethane diisocyanate, and xylene diisocyanate, or a blocking compound of a derivative thereof. For example, the isocyanate compound may prepared by blocking a portion or all of an isocyanate group of the isocyanate monomer compound or isocyanate derivatives, such as a biuret body and an isocyanate body of the isocyanate monomer compound, with a blocking agent. Also, ε-caprolactam, methyl ethyl ketone oxime, 1,2-pyrazole, diisopropylamine, or dimethylpyrazole may be used as the blocking agent.

In the present invention, any steel sheet may be used regardless of type, e.g., an alloyed-zinc-plated steel sheet, an electrogalvanized steel sheet, and a hot dip zinc plated steel sheet, so long as the steel sheet is used for the pre-coated metal, and for example, the steel sheet may be an alloyed-zinc-plated steel sheet.

Also, the paint composition for pre-coating according to the present invention is a thermosetting paint composition curable through a heat treatment and in particular, may be a one-component type thermosetting paint composition.

Also, other features of the present invention include a method of processing pre-coated metal including primary curing of a coating layer for molding after being coated with the paint composition, molding, appearance recovery after the molding, and secondary curing of the coating layer for improving mechanical properties of the coating layer.

An objective of the primary curing is to satisfy processability and mechanical properties of the pre-coated metal. The secondary curing is denoted as a recuring process of the coating layer primarily bake hardened, may be simultaneously performed with a curing process of an adhesive, and aims to improve strength and scratch resistance and recover physical properties of appearance.

A heating temperature (a maximum reached temperature of the steel sheet) in the primary curing may be within a range of 180° C. to 300° C. The reason for this is that when the heating temperature is less than 180° C., some adhesion characteristics may be exhibited due to an uncured state, and when the heating temperature is greater than 300° C., appearance of the coating layer may be deteriorated due to too fast curing. For example, the heating temperature of the primary curing may be within a range of 180° C. to 250° C.

Also, the primary curing may be performed for a time range of 10 seconds to 5 minutes. When the time is less than 10 seconds, a subsequent molding process may not be performed because curing of the coating layer is insufficient, and physical properties required in the molding process may not only be provided within 5 minutes, but also recovery of the physical properties in the secondary curing may be insufficient due to excessive curing when the time is greater than 5 minute. The heat treatment time (bake hardening time) of the primary curing may be within a range of 10 seconds to 3 minutes and for example, may be in a range of 10 seconds to less than 1 minute.

Further, a heating temperature (a maximum reached temperature of the steel sheet) in the secondary curing may be within a range of 140° C. to 200° C. The reason for this is that when the heating temperature is less than 140° C., the secondary curing may not be performed, and when the heating temperature is greater than 200° C., modification of the coating layer may occur. For example, the heating temperature of the secondary curing may be within a range of 150° C. to 180° C.

The secondary curing may be performed for a time range of 5 minutes to 50 minutes. When the time is less than 5 minutes, sufficient crosslink density required for the secondary curing of the coating layer may not increase, and when the time is greater than 50 minutes, the coating layer may be yellowed by modification. The heat treatment time (bake hardening time) of the secondary curing may be within a range of 10 minutes to 25 minutes.

Hereinafter, the present invention will be described in detail, according to specific examples. However, the scope of the present invention is not limited thereto.

Example 1

In an exemplary example of the present invention, a 0.8 mm thick alloyed-zinc-plated steel sheet was used as a steel sheet. Both chrome free type alkaline-based and acid-based pretreatment agents may be used for a pretreatment before forming a coating layer of a paint composition for pre-coating, and the alkaline-based pretreatment agent may be used. Specifically, a coating layer having a range of 60 mg/m² to 80 mg/m² was formed by using Nipsea Chemical Co., Ltd. NC-COAT #3300.

As shown in the following Table 1, polyester resins having a number-average molecular weight range of 10,000 to 25,000 and a hydroxyl group value range of 6 mgKOH/g to 19 mgKOH/g were used as a binder resin included in the paint composition for pre-coating to be coated on a surface of the steel sheet thus pretreated.

TABLE 1

| Binder resin | | | | |
|---|---|---|---|---|
| Product | Type | Number-average molecular weight | Hydroxyl group value [mgKOH/g resin] | Manufacturer |
| ES-901 | Polyester | 21,000 | 6 | SK Chemical |
| ES-955 | Polyester | 12,000 | 12 | SK Chemical |
| ES-980 | Polyester | 12,000 | 17 | SK Chemical |
| ES-960 | Polyester | 7,500 | 19 | SK Chemical |

Also, a hardener, in which commercial blocked isocyanate product (Bayer AG) and melamine product (Cytec Industries, Inc.) were mixed, was used as a hardener included in the paint composition for pre-coating as shown in the following Table 2. Detailed characteristics of each hardener used are listed in Table 2.

TABLE 2

| Hardener | | | |
|---|---|---|---|
| Hardener 1 | | Hardener 2 | |
| Product | Characteristics | Product | Characteristics |
| Desmodur BL 3175 SN | MEKO blocked HDI trimer | Cymel 303LF | Highly methylated type melamine |
| Desmodur BL 4265 SN | MEKO blocked IPDI trimer | Cymel 325 | Methylated high imino type melamine |

Clear coat compositions for pre-coating were prepared by mixing the binder resins and the hardeners as shown in the following Tables 3 and 4. At this time, catalysts were used during the mixing of the binder resin and the hardener as shown in the following Tables 3 and 4. Catalysts 1 and 2 in the following Tables 3 and 4 were dibutyltin dilaurate and paratoluene sulfonic acid, respectively.

TABLE 3

| Sample name | Resin | Hardener 1 [g] | Catalyst 1 [g] | Hardener 2 [g] | Catalyst 2 [g] |
|---|---|---|---|---|---|
| T8201 | ES-901 | 14.5 BL 4265 | 0.273 | 0.035 Cymel 303LF | 0.816 | — |
| T8202 |  | 14.5 BL 4265 | 0.273 | 0.035 Cymel 303LF | 0.816 | 0.033 |
| T8203 | ES-955 | 14.5 BL 4265 | 0.546 | 0.071 Cymel 303LF | 0.816 | — |
| T8204 |  | 14.5 BL 4265 | 0.546 | 0.071 Cymel 303LF | 0.816 | 0.033 |
| T8205 | ES-960 | 10.0 BL 4265 | 0.865 | 0.112 Cymel 303LF | 0.816 | — |
| T8206 |  | 10.0 BL 4265 | 0.865 | 0.112 Cymel 303LF | 0.816 | 0.033 |
| T8207 | ES-901 | 14.5 BL 4265 | 0.273 | 0.035 Cymel 325 | 1.000 | — |
| T8208 | ES-955 | 14.5 BL 4265 | 0.546 | 0.071 Cymel 325 | 1.000 | — |
| T8209 | ES-960 | 10.0 BL 4265 | 0.865 | 0.112 Cymel 325 | 1.000 | — |
| T8210 | ES-901 | 14.5 BL 3175 | 0.173 | 0.026 Cymel 303LF | 0.816 | — |
| T8211 |  | 14.5 BL 3175 | 0.173 | 0.026 Cymel 303LF | 0.816 | 0.033 |
| T8212 | ES-955 | 14.5 BL 3175 | 0.345 | 0.052 Cymel 303LF | 0.816 | — |
| T8213 |  | 14.5 BL 3175 | 0.345 | 0.052 Cymel 303LF | 0.816 | 0.033 |
| T8214 | ES-960 | 10.0 BL 3175 | 0.547 | 0.082 Cymel 303LF | 0.816 | — |
| T8215 |  | 10.0 BL 3175 | 0.547 | 0.082 Cymel 303LF | 0.816 | 0.033 |
| T8216 | ES-901 | 14.5 BL 3175 | 0.173 | 0.026 Cymel 325 | 1.000 | — |
| T8217 | ES-955 | 14.5 BL 3175 | 0.345 | 0.052 Cymel 325 | 1.000 | — |
| T8218 | ES-960 | 10.0 BL 3175 | 0.547 | 0.082 Cymel 325 | 1.000 | — |

TABLE 4

| Sample name | Resin | Hardener 1 [g] | Catalyst 1 [g] | Hardener 2 [g] | Catalyst 2 [g] |
|---|---|---|---|---|---|
| T8101 | ES-901 | 14.5 BL 4265 | 0.273 | 0.035 Cymel 303LF | 0.408 | — |
| T8102 |  | 14.5 BL 4265 | 0.273 | 0.035 Cymel 303LF | 0.408 | 0.033 |
| T8103 | ES-955 | 14.5 BL 4265 | 0.546 | 0.071 Cymel 303LF | 0.408 | — |
| T8104 |  | 14.5 BL 4265 | 0.546 | 0.071 Cymel 303LF | 0.408 | 0.033 |
| T8105 | ES-960 | 10.0 BL 4265 | 0.865 | 0.112 Cymel 303LF | 0.408 | — |
| T8106 |  | 10.0 BL 4265 | 0.865 | 0.112 Cymel 303LF | 0.408 | 0.033 |

TABLE 4-continued

| Sample name | Resin [g] | Hardener 1 [g] | Catalyst 1 [g] | Hardener 2 [g] | Catalyst 2 [g] |
|---|---|---|---|---|---|
| T8107 | ES-901 | 14.5 BL 4265 | 0.273 | 0.035 Cymel 325 | 0.500 — |
| T8108 | ES-955 | 14.5 BL 4265 | 0.546 | 0.071 Cymel 325 | 0.500 — |
| T8109 | ES-960 | 10.0 BL 4265 | 0.865 | 0.112 Cymel 325 | 0.500 — |
| T8110 | ES-901 | 14.5 BL 3175 | 0.173 | 0.026 Cymel 303LF | 0.408 — |
| T8111 |  | 14.5 BL 3175 | 0.173 | 0.026 Cymel 303LF | 0.408 0.033 |
| T8112 | ES-955 | 14.5 BL 3175 | 0.345 | 0.052 Cymel 303LF | 0.408 — |
| T8113 |  | 14.5 BL 3175 | 0.345 | 0.052 Cymel 303LF | 0.408 0.033 |
| T8114 | ES-960 | 10.0 BL 3175 | 0.547 | 0.082 Cymel 303LF | 0.408 — |
| T8115 |  | 10.0 BL 3175 | 0.547 | 0.082 Cymel 303LF | 0.408 0.033 |
| T8116 | ES-901 | 14.5 BL 3175 | 0.173 | 0.026 Cymel 325 | 0.500 — |
| T8117 | ES-955 | 14.5 BL 3175 | 0.345 | 0.052 Cymel 325 | 0.500 — |
| T8118 | ES-960 | 10.0 BL 3175 | 0.547 | 0.082 Cymel 325 | 0.500 — |

Surfaces of the alloyed-zinc-plated steel sheets were coated with the paint compositions for pre-coating mixed as in Tables 3 and 4, and primary curing (bake hardening) processes were then performed on the steel sheets at a maximum reached temperature of 232° C. As a result, coating layers having a thickness of 10±1 μm were formed.

The pre-coated steel sheets after the primary bake hardening processes were tensioned at a strain of 8% by using a tensile testing machine and physical properties of appearances (glosses) of the coating layers were then evaluated. Also, secondary curing processes were performed at 155° C. for 15 minutes to evaluate changes in physical properties of appearances (glosses) of the coating layers.

Further, in order to test processabilities and adhesions of the coating layers, the coating layers were cut in accordance with a method suggested in ISO 2409 and then processed by a method suggested in ISO 1520, and evaluated by using an adhesive tape in accordance with a method suggested in ISO 2409. As a result, all values obtained were zero.

The following Tables 5 and 6 list the results of gloss tests performed for each operation.

TABLE 5

Gloss measurement results of the coating layers according to the mixing ratios of Table 3

| Sample Name | Coating layer thickness [μm] | Primary curing 20° | Primary curing 60° | Primary curing 85° | After drawing 20° | After drawing 60° | After drawing 85° | Secondary curing after drawing 20° | Secondary curing after drawing 60° | Secondary curing after drawing 85° |
|---|---|---|---|---|---|---|---|---|---|---|
| T8201 | 15 | 39.4 | 91.1 | 70.7 | 27.6 | 72.9 | 65.1 | 29.7 | 79.8 | 70.3 |
| T8202 | 14 | 38 | 96.4 | 78.9 | 33 | 90.2 | 82.7 | 38 | 96.9 | 82.5 |
| T8203 | 17.5 | 79 | 116 | 93 | 39.9 | 96.1 | 87.1 | 55.3 | 106 | 90.8 |
| T8204 | 19 | 78.2 | 115 | 95.7 | 49.4 | 94.9 | 86.4 | 74.5 | 111 | 93.1 |
| T8205 | 13 | 60 | 107 | 84.4 | 53.8 | 103 | 90.8 | 55.1 | 103 | 91.4 |
| T8206 | 12 | 74 | 114 | 94 | 37.9 | 91.6 | 79.4 | 49.7 | 103 | 82 |
| T8207 | 13.5 | 41.5 | 98.5 | 82.9 | 30.9 | 86.3 | 81 | 34.4 | 91.1 | 81 |
| T8208 | 16 | 63.8 | 111 | 91.6 | 29 | 78.6 | 83.1 | 53.4 | 105 | 88.2 |
| T8209 | 16.5 | 67.7 | 109 | 93.5 | 55.9 | 103 | 86 | 54.5 | 102 | 87.1 |
| T8210 | 15 | 28.6 | 65.9 | 56.7 | 14 | 40.8 | 40.6 | 16.6 | 43.4 | 43.4 |
| T8211 | 15 | 27.1 | 74.4 | 58.4 | 21.9 | 69.2 | 65.2 | 23.9 | 73 | 66.8 |
| T8212 | 16.5 | 70.4 | 114 | 94.3 | 39.2 | 87 | 72.9 | 41.7 | 92.4 | 81.8 |
| T8213 | 15 | 74.5 | 114 | 91.7 | 41 | 96.3 | 86.6 | 48.5 | 102 | 88.6 |
| T8214 | 15.5 | 60.8 | 111 | 95.3 | 27.7 | 81.3 | 85.3 | 32.5 | 87.5 | 87.4 |
| T8215 | 18 | 64.2 | 111 | 93.8 | 41.8 | 96.3 | 89.2 | 45.6 | 99 | 88.3 |
| T8216 | 12.5 | 31.9 | 79.8 | 66.7 | 24.5 | 75.3 | 70.6 | 26.2 | 79.8 | 72.9 |
| T8217 | 17 | 72.7 | 115 | 94.4 | 27.1 | 74.3 | 77.3 | 44.1 | 97.8 | 81.4 |
| T8218 | 21 | 66.4 | 111 | 91.3 | 31.8 | 85.4 | 82.4 | 41 | 96.1 | 85.3 |

TABLE 6

Gloss measurement results of the coating layers according to the mixing ratios of Table 4

| Sample Name | Coating layer thickness [μm] | Primary curing 20° | Primary curing 60° | Primary curing 85° | After drawing 20° | After drawing 60° | After drawing 85° | Secondary curing after drawing 20° | Secondary curing after drawing 60° | Secondary curing after drawing 85° |
|---|---|---|---|---|---|---|---|---|---|---|
| T8101 | 12 | 43.8 | 101 | 89.6 | 19.9 | 66.7 | 79.2 | 26.2 | 80.5 | 81.9 |
| T8102 | 11.5 | 35 | 93.9 | 83.9 | 24.5 | 77.3 | 79.6 | 32.6 | 90.6 | 81.5 |
| T8103 | 17.5 | 71.6 | 109 | 95.5 | 49.3 | 98.9 | 86.6 | 51.4 | 101 | 88.8 |
| T8104 | 17 | 69.9 | 114 | 94.8 | 31.7 | 85.8 | 85.4 | 48.6 | 103 | 89.9 |

TABLE 6-continued

Gloss measurement results of the coating layers according to the mixing ratios of Table 4

| Sample Name | Coating layer thickness [μm] | Primary curing 20° | Primary curing 60° | Primary curing 85° | After drawing 20° | After drawing 60° | After drawing 85° | Secondary curing after drawing 20° | Secondary curing after drawing 60° | Secondary curing after drawing 85° |
|---|---|---|---|---|---|---|---|---|---|---|
| T8105 | 11 | 58.8 | 111 | 91.1 | 32.1 | 87.9 | 84.4 | 41.1 | 100 | 88.7 |
| T8106 | 17.5 | 80.4 | 115 | 96.5 | 57.2 | 106 | 91.7 | 68.5 | 112 | 94.6 |
| T8107 | 11.5 | 37.9 | 97.7 | 84.9 | 24.6 | 78.8 | 77.5 | 30.3 | 88.4 | 81.5 |
| T8108 | 13 | 63.8 | 111 | 94.3 | 40.9 | 90.2 | 78.5 | 43.8 | 97.4 | 84.2 |
| T8109 | 15 | 63.4 | 112 | 95 | 39.1 | 93.2 | 88.1 | 46.6 | 101 | 90.4 |
| T8110 | 8.5 | 49.6 | 113 | 78.7 | 26.8 | 78.1 | 69.7 | 32.7 | 91.6 | 74.8 |
| T8111 | 9.5 | 42.5 | 99.6 | 70.2 | 21.6 | 67 | 58.5 | 24.3 | 73.8 | 61.6 |
| T8112 | 8.5 | 74.2 | 130 | 92.2 | 26.4 | 78.5 | 73.8 | 31.7 | 91.1 | 78.5 |
| T8113 | 9 | 60.4 | 125 | 86.7 | 26 | 76.5 | 68.9 | 30.4 | 89.2 | 74.8 |
| T8114 | 13.5 | 96.2 | 141 | 96.1 | 35.2 | 95 | 80.4 | 35.7 | 96.2 | 81.1 |
| T8115 | 15 | 87.8 | 138 | 94.2 | 35 | 95.5 | 78.3 | 36 | 96.4 | 79.3 |
| T8116 | 8.5 | 50.8 | 112 | 74.6 | 26.2 | 76.8 | 62.6 | 29.5 | 85.2 | 65.3 |
| T8117 | 8.5 | 75.8 | 134 | 91 | 28.8 | 83.9 | 75 | 33.6 | 96.1 | 79 |
| T8118 | 14.5 | 90.5 | 138 | 93.5 | 35.7 | 95.7 | 79.2 | 36 | 96.7 | 80 |

As shown in Tables 5 and 6, with respect to the method according to Example 1 of the present invention, it may be understood that glosses, appearance characteristics of the coating layers, were overall recovered through secondary curing after drawing.

In particular, with respect to samples (T8204, T8106, T8203, T8205, T8208, T8209, T8103) in which 20° gloss was recovered to a value of 50 or more after the secondary curing among the foregoing samples, pencil hardness (ISO 15184) and acid resistance tests were performed in order to evaluate mechanical and chemical characteristics of the coating layers in addition to the appearance characteristics of the coating layers, and the results thereof are presented in the following Table 7.

TABLE 7

| Sample Name | Pencil hardness Primary curing | Pencil hardness Secondary curing | Acid resistance |
|---|---|---|---|
| T8204 | HB | HB | ○ |
| T8106 | 3B | B | ○ |
| T8203 | HB | HB | ○ |
| T8205 | B | B | ○ |
| T8208 | B | HB | ○ |
| T8209 | B | B | x |
| T8103 | B | HB | ○ |

Since samples, in which variations of gloss through the secondary curing process were relatively small, among Tables 5 and 6 had larger curing amounts in the primary curing than those of the samples of Table 7, an effect affecting physical properties decreased during drawing processing was relatively small even in the case that the secondary curing process was performed. Therefore, according to the present invention, it may be understood that appropriate mixing of the paint compositions and control of processing variables of the primary curing were required, and as a result, physical properties of the coating layer after processing, which were not realized in a typical pre-coated steel sheet, may be realized.

Mode for Invention

Example 2

In the present Example, paints were prepared by mixing PPG Korea resins of the following Table 8 and the resins and the hardeners of Tables 1 and 2 as in Table 9 below.

TABLE 8

| Resins of PPG Korea | | | | |
|---|---|---|---|---|
| Product | Type | Number-average molecular weight | Hydroxyl group value [mgKOH/g resin] | Manufacturer |
| HC-872 | Polyester | 3771 | 29.34 | PPG Korea |
| HC-873 | Polyester | 4165 | 29.34 | PPG Korea |

TABLE 9

| Sample | Resin 1 | Resin 2 (ES-955) [g] | Hardener 1 (BL4265SN) [g] | Catalyst (DBTL) [g] | Hardener 2 (Cymel 325) [g] |
|---|---|---|---|---|---|
| RBSB1-7/3 | HC-872 5.00 | 5.43 | 1.37 | 0.18 | 1.00 |
| RBSB2-7/3 | HC-873 5.00 | 5.43 | 1.37 | 0.18 | 1.00 |
| RBSB1-5/5 | HC-872 3.57 | 9.06 | 1.18 | 0.15 | 1.00 |
| RBSB2-5/5 | HC-873 3.57 | 9.06 | 1.18 | 0.15 | 1.00 |
| RBSB1-3/7 | HC-872 2.14 | 12.68 | 0.98 | 0.13 | 1.00 |
| RBSB2-3/7 | HC-873 2.14 | 12.68 | 0.98 | 0.13 | 1.00 |

White PCM steel sheets were coated with the paints prepared as in Table 9. A method of curing coating layers thus coated was performed in the same manner as that of T8208 of Example 1.

Evaluation of physical properties of the coating layers was performed by using yellowing and a methyl ethyl ketone (MEK) rub test method. The yellowing was determined such that degrees of yellowing of the coating layer before and after the secondary curing were compared by measuring a color difference, and in the MEK rub test for measuring curing density of the coating layer, 20° glosses were compared by measuring gloss of the coating layer after performing 50 times of a reciprocating motion under a 2 kg load. The results thereof are presented in Table 10.

TABLE 10

| Test number | Thickness [μm] | Yellowing ΔE | 20° gloss Primary curing | 20° gloss Secondary curing | MEK rub test |
|---|---|---|---|---|---|
| RBSB1-7/3 | 21 | 0.92 | 86.7 | 88 | 29.5 |
| RBSB2-7/3 | 21 | 1.79 | 86.5 | 84.1 | 68 |
| RBSB1-5/5 | 16 | 0.84 | 83.8 | 85.8 | 61.1 |
| RBSB2-5/5 | 15 | 1.11 | 84.3 | 83.2 | 73.5 |
| RBSB1-3/7 | 20 | 1.21 | 94.6 | 94.3 | 86.9 |
| RBSB2-3/7 | 20 | 0.85 | 93.3 | 92.1 | 82.6 |

As shown in Table 10, it may be understood that 20° glosses having the almost same level as that obtained during the primary curing may be obtained through the secondary curing by using the paint compositions according to Example 2 of the present invention.

Meanwhile, when HC-873 and ES-955 resins are mixed, it may be confirmed that greater resistance to the yellowing due to the secondary curing was obtained and curing density was also increased as a content of Resin 2 was increased. With respect to the HC-872 resin, yellowing and curing density were contradictory to each other. Since the results in Table 10 may be changed according to compatibility between resins, hydroxyl group value and molecular weight and distributions thereof, and type of hardeners, it means that physical properties of the coating layer superior to those of a conventional coating layer may be obtained by selecting combination of resin and hardener and curing method based on the finally required physical properties of the coating layer.

Figure 2:
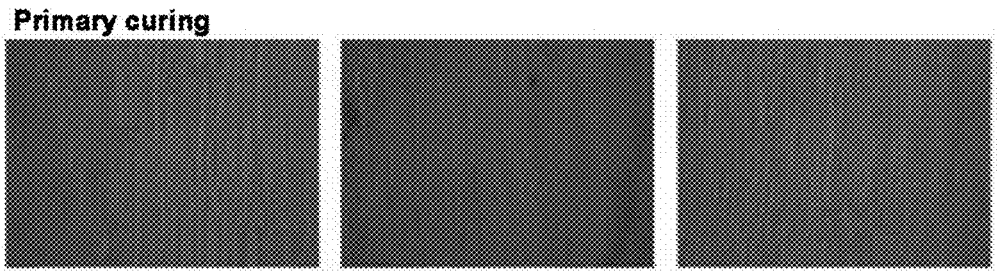
FIG. 2 is photographs showing appearances after primary curing, T-bending (2T), and secondary curing when the paint compositions according to Example 2 are used.
Figure 2:
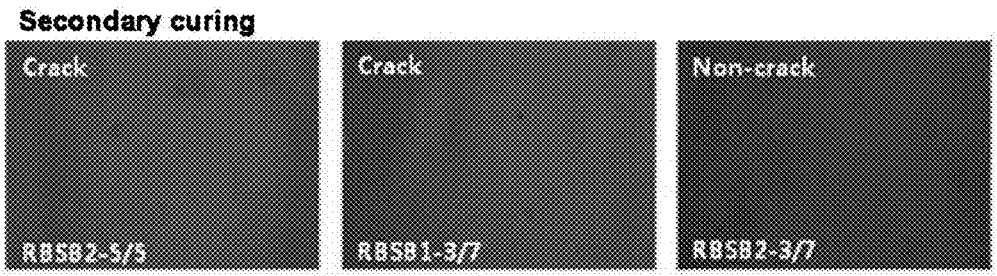

Also, T-bending tests were performed on steel sheets coated with sample names RBSB2-5/5, RBSB1-3/7, and RBSB2-3/7 of Example 2 in the present invention, and the results of optical microscopic observations on the steel sheets after 1T and 2T bending tests are presented in FIGS. 1 and 2, respectively. According to FIG. 2, it may be confirmed that damages due to the processing after the primary curing were recovered by the secondary curing and RBSB2-3/7 among the paint samples exhibited the best recovery.

The invention claimed is:

1. A method of treating a surface of a steel sheet, the method comprising the steps of:
    (a) forming a coating layer by coating the surface of the steel sheet with a paint composition comprising a binder resin selected from the group consisting of a polyester resin, an alkyd resin, an acrylic resin, and a modified resin thereof, wherein the binder has a hydroxyl value of 5 mgKOH/g to 100 mgKOH/g and a molecular weight of 1,000 to 25,000;
    (b) performing primary curing on the coating layer by heating within a temperature range of 180° C. to 300° C.;
    (c) molding the steel sheet having the primarily cured coating layer formed thereon by mechanical processing; and
    (d) performing secondary curing on the molded steel sheet by heating within a temperature range of 140° C. to 200° C. to recover physical properties of the coating layer damaged in the molding.

2. The method according to claim 1, wherein the primary curing of the step (b) is performed for a time range of 10 seconds to 5 minutes and the secondary curing of the step (d) is performed for a time range of 5 minutes to 50 minutes.

3. The method according to claim 1, wherein the paint composition comprises
    a hardener selected from one or more of an isocyanate group and a melamine group.

4. The method according to claim 3, wherein the isocyanate group is one or more selected from the group consisting of hexamethylene diisocyanate, isophorone diisocyanate, diphenylmethane diisocyanate, and xylene diisocyanate, or a blocked isocyanate group.

5. The method according to claim 3, wherein a stoichiometric ratio of the isocyanate group to a hydroxyl group of the resin is in a range of 0.6 to 1.4.

6. The method according to claim 3, wherein the melamine group is one or more selected from the group consisting of alkylate, imino, and carboxylate.

7. The method according to claim 3, wherein a weight ratio of the melamine group to a total resin content of the paint composition is in a range of 10% to 50%.

* * * * *